United States Patent
Chaudhari et al.

(10) Patent No.: US 7,037,877 B1
(45) Date of Patent: *May 2, 2006

(54) PROCESS FOR THE PREPARATION OF COPPER CHROMITE CATALYST

(75) Inventors: Raghunath Vitthal Chaudhari, Maharashtra (IN); Rengaswamy Jaganathan, Maharashtra (IN); Sopan Tukaram Chaudhari, Maharashtra (IN); Chandrashekhar Vasant Rode, Maharashtra (IN)

(73) Assignee: Council of Scientific and Industrial Research, New Delhi (IN)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1000 days.

(21) Appl. No.: 09/257,108

(22) Filed: Feb. 24, 1999

(30) Foreign Application Priority Data

Feb. 12, 1999 (IN) .......................... 239/DEL/99

(51) Int. Cl.
*B01J 21/04* (2006.01)
*B01J 23/06* (2006.01)
*B01J 23/26* (2006.01)
*B01J 23/72* (2006.01)

(52) U.S. Cl. ................... 502/307; 502/305; 502/318; 502/319; 502/320; 502/323; 502/345; 502/346; 502/355

(58) Field of Classification Search ............... 502/305, 502/307, 318, 319, 320, 323, 345, 346, 355
See application file for complete search history.

(56) References Cited

U.S. PATENT DOCUMENTS

| | | | | |
|---|---|---|---|---|
| 4,160,746 A | * | 7/1979 | Rashkin ..................... 252/468 |
| 4,590,176 A | * | 5/1986 | Hoek et al. |
| 4,825,004 A | * | 4/1989 | Rutzen et al. .............. 568/864 |
| 5,055,599 A | * | 10/1991 | Budge |
| 5,217,937 A | * | 6/1993 | Schneider et al. .......... 502/242 |
| 5,654,489 A | * | 8/1997 | Kawai et al. ................ 568/361 |
| 5,663,458 A | * | 9/1997 | Ito et al. ..................... 568/814 |
| 5,767,326 A | * | 6/1998 | Kleemiss et al. ........... 568/700 |
| 5,820,749 A | * | 10/1998 | Haluska et al. ............. 208/216 |

* cited by examiner

*Primary Examiner*—Steven P. Griffin
*Assistant Examiner*—Christina Ildebrando
(74) *Attorney, Agent, or Firm*—Ladas & Parry

(57) ABSTRACT

The present invention provides a process for the preparation of an improved copper chromite catalyst for the hydrogenation of diethyl maleate to tetrahydrofuran with very high selectivity. This invention particularly relates to a process for the preparation of an improved copper chromite catalyst with specific composition and physical properties containing copper, chromium, zinc and aluminium as catalyst components in order to achieve selective production of tetrahydrofuran via single step hydrogenation of diethyl maleate. The calcination procedure has also been described to achieve the best activity. The catalyst has a life of more than 630 hours with constant activity. The used catalyst can also be regenerated to match the original hydrogenation activity.

10 Claims, No Drawings

PROCESS FOR THE PREPARATION OF COPPER CHROMITE CATALYST

FIELD OF INVENTION

This invention relates to a process for the preparation of an improved copper chromite catalyst useful for hydrogenation of diethyl maleate (DEM) to tetrahydrofuran (THF) with very high selectivity. More particularly, it relates to a process for the preparation of an improved copper chromite catalyst with uniform composition and specific characteristics containing copper, chromium zinc and aluminium as catalyst components. The catalyst thus prepared is then calcined according to the procedure described here and this catalyst has the specific characteristics such as surface area, porosity, particle density. The process of the present invention could be used by catalyst manufacturers and producers of tetrahydrofuran. The catalyst system comprises the mixed oxides of copper, chromium, aluminium and zinc to give high selectivity of tetrahydrofuran over longer period of time. The used catalyst can be regenerated and reused again.

BACKGROUND OF INVENTION

In the prior art, the use of copper chromite catalyst is described for its catalytic activity for the hydrogenation of dicarboxylic acids or dicarboxylic acid esters and/or anhydrides. Most of these patents use copper chromite catalysts containing the combination of one or more mixed oxides of copper, zinc, barium, aluminum of varying composition. Such catalysts have been procured from the catalyst manufacturers. U.S. Pat. No. 4,810,807, (1989) describes the hydrogenation of butyl ester of maleic anhydride using a copper chromite catalyst commercially available from United Catalysts (No. T-2107). The patent also mentions the use of a cocatalyst consisting of oxides of copper, chromium and barium available from Harshaw/Filtrol (No. 1107T).

The U.S. Pat. No. 4,584,419 (1986) and the International Patent W086/03189 (1986) use the most preferred catalysts which contain copper and chromium together in a range of 60–62% and no more than approximately 15% by weight of stabilizers (i.e. barium and/or manganese). The method of catalyst preparation is not clearly understood from these literature, however, the reduction of the copper chromite has been described in International patent WO 86/03189 (1986).

Recently, Castiglioni et al. (Chemistry and Industry, 5 Jul. 1993,) have reported preparation of copper chromite catalyst by using sodium carbonate as precipitating agent. Also, the copper chromite catalysts mentioned in this paper do not contain aluminum and zinc together, and the side products such as butanol etc. obtained are in high quantities.

OBJECTS OF THE INVENTION

In the present invention we propose the preparation method for an improved copper chromite catalyst of a particular composition and with specific physical characteristics for hydrogenation of diethyl maleate to give highest selectivity of tetrahydrofuran. The catalyst composition is uniform and this eliminates the use of a cocatalyst or different catalyst zone. Also, the stability of the catalyst is tested for continuous hydrogenation for more than 630 hours and it was found that it was not necessary to add a stabilizer to the catalyst system. The catalyst is calcined in three steps with varying temperatures. The catalyst can also be regenerated and used again for the hydrogenation of diethyl maleate to THF.

It is therefore an object of the present invention to provide an improved copper chromite catalyst of uniform composition and specific characteristics for giving better activity and selectivity in vapor phase hydrogenation of diethyl maleate.

It is another object of the present invention to provide a method for preparation of an improved copper chromite catalyst of uniform composition and specific characteristics for giving better activity and selectivity in vapor phase hydrogenation of diethyl maleate.

SUMMARY OF THE INVENTION

The present invention discloses a novel copper chromite catalyst useful for the hydrogenation of diethyl maleate to tetrahydrofuran with a . very high selectivity. The catalyst is characterized by a uniform composition and specific characteristics such as surface area, porosity and particle density and comprises mixed oxides of copper, chromium, aluminum and zinc. It is prepared by making an aqueous mixture of solutions of a source of copper, a source of aluminum and a source of zinc and adding to this mixture a source of chromium. The resultant precipitate is separated and calcined under specific conditions of temperature and pressure to obtain the product. The catalyst has a life of more than 630 hours with constant activity. The used catalyst can also be regenerated to match the original hydrogenation activity.

Accordingly, the present invention provides an improved copper chromite catalyst having the molar composition $$Cu_{(a)}Cr_{(b)}Al_{(c)}Zn_{(d)}$$

Wherein
  a=10–40 mole %
  b=10–40 mole %
  c=10–30 mole %
  d=5–40 mole %
  and a+b+c+d=100 and characterized by XRD pattern as shown in table I

TABLE I

XRD analysis of the copper chromite catalyst

| θ | Intensity (%) |
|---|---|
| 18 | 100 |
| 26.2 | 100 |
| 27.4 | 48 |
| 35.8 | 92 |
| 44.2 | 48 |
| 56.6 | 44 |

The present invention also provides a process for the preparation of the above-mentioned caltalyst which comprises preparing aqueous solutions of source of copper, a source of aluminum and a source of zinc, adding to this mixture a solution of source of chromium, under stirring conditions to obtain the precipitate, separating the precipitate by conventional methods, drying the precipitate at a temperature ranging between 80 to 110° C., calcining the dried material in static air at a temperature ranging between 200 to 500° C. for a period ranging between 2 to 5 hrs., to obtain the product.

In a preferred embodiment the source of copper is a salt of copper selected from nitrate, sulfate, acetate or chloride, preferably, copper nitrate.

In yet another embodiment the source of aluminum is an aluminum salt selected from nitrate, chloride, or aluminum oxide, preferably, aluminum nitrate.

In yet another embodiment the source of zinc is a salt of zinc selected from nitrate, or zinc sulfate or chloride, or zinc oxide, preferably, zinc nitrate.

In yet another embodiment the source of source of chromium is an ammonium salt selected from ammonium dichromate or ammonium chromate, preferably ammonium dichromate.

In a feature of the present invention the catalyst prepared as per the procedure described in examples is required to be calcined under static air in a muffle furnace at 200° C. for one hour, 300° C. for one hour and at 400° C. for two hours. Before carrying out hydrogenation experiments, the catalyst is to be activated in situ in the reactor. This is done under a steady flow of hydrogen at a temperature 80 to 230° C. The most preferred temperature is 175–200° C. The activation can be done with pure hydrogen or hydrogen diluted with an inert like nitrogen. The pressure of activation can be between 1–30 atmospheres. The most preferred pressure of activation is 5–15 atmospheres. The catalyst should be activated for a period of 200 hours. The most preferred activation period is 100 hours.

The process of the present invention results in an improved copper chromite catalyst of the particular composition and specific characteristics for giving better activity and selectivity in vapor phase hydrogenation of diethyl maleate.

The process of the invention is described hereinbelow with examples, which are illustrative only and should not be considered to limit the scope of the invention.

The experiments were carried out in a single tube reactor of 19 mm diameter. In a typical experiment the catalyst was charged approximately in the middle portion of the reactor tube. The space above and below the catalyst was packed with inert corborundum beads. The reactor was heated by electric furnaces. The liquid feed (DEM) and hydrogen were introduced near the top of the reactor. The inert zone over the top of the catalyst serves as a preheater for the reactants. The product stream leaving the reactor is cooled to condense the liquid products.

EXAMPLE 1

An improved copper chromite catalyst was prepared by the following procedure. A mixture of 302 gm of copper nitrate, 281.5 gm of aluminum nitrate and 149 gm of zinc nitrate was dissolved in 2000 ml of distilled water. A solution of ammonium dichromate was prepared by dissolving 315 gms of ammonium dichromate in 1500 ml distilled water and adding dropwise approximately 220 ml of 30% aqueous ammonia solution. The solution of nitrate was stirred while the ammonium chromate solution was poured into it in a thin stream. Stirring was continued till the addition was completed after which a reddish brown precipitate was obtained. This precipitate was filtered and dried in a oven at 110° C. This dry precipitate was then calcined in a muffle furnace for one hour at 200° C., one hour at 300° C. and two hours at 400° C. The dry copper chromite catalyst thus obtained was pelletized and stored in bottles.

The catalyst composition before calcination and reduction is: Cu+Cr=50 mol %, Zn=20 mol %, Al=30 mol %.

The reactor was packed with 30 gms of the catalyst prepared as per the procedure discribed above. This was activated in situ under a continuous flow of hydrogen at 150° C. for two hours, at 200° C. for 24 hours and at 200° C. and 10 bar pressure for 48 hours. Pure hydrogen gas was used at a flow rate of 10 Nl/hr. After the activation the hydrogenation of diethyl maleate reaction was carried out and the XRD analysis was carried out in the usual manner. The selectivity of tetrahydrofuran was tested and was found to be 90%.

EXAMPLE 2

In this example, a copper chromite catalyst was prepared by the following procedure. A mixture of 48.33 gm of copper nitrate and 18.8 gm of aluminium nitrate was dissolved in 200 ml of distilled water. A solution of ammonium dichromate was prepared by dissolving 31.5 gms of ammonium dichromate in 150 ml distilled water and adding dropwise approximately 25 ml of 30% aqueous ammonia solution. The solution of nitrate was stirred while the ammonium chromate solution was poured into it in a thin stream. Stirring was continued till the addition was completed after which a reddish brown precipitate was obtained. This precipitate was filtered and dried in a oven at 110° C. This dry precipitate was then calcined in a muffle furnace for one hour at 200° C., one hour at 300° C. and two hours at 400° C. The dry copper chromite catalyst thus obtained was pelletized and stored in bottles.

The catalyst composition before calcination and reduction is: Cu+Cr=80 mol % and Al=20 mol %. After the activation of the catalyst the hydrogenation of diethyl maleate reaction was carried out as described earlier. The selectivity of tetrahydrofuran obtained was <30% and there was formation of undesirable side products.

EXAMPLE 3

In this example, a copper chromite catalyst with different composition was prepared by the following procedure. A mixture of 105.7 gm of copper nitrate and 55.77 gm of zinc nitrate was dissolved in 500 ml of distilled water. A solution of ammonium dichromate was prepared by dissolving 78.75 gms of ammonium dichromate in 375 ml distilled water and adding dropwise approximately 55 ml of 30% aqueous ammonia solution. The solution of nitrate was stirred while the ammonium chromate solution was poured into it in a thin stream. Stirring was continued till the addition was completed after which a reddish brown precipitate was obtained. This precipitate was filtered and dried in a oven at 110° C. This dry precipitate was then calcined in a muffle furnace for one hour at 200° C. , one hour at 300° C. and two hours at 400° C. The dry copper chromite catalyst thus obtained was pelletized and stored in bottles.

The catalyst composition before calcination and reduction is : Cu+Cr=70 mol % and Zn=30 mol %. After the activation of the catalyst the hydrogenation of diethyl maleate reaction was carried out as described earlier. The selectivity of tetrahydrofuran obtained was <25 % and there was formation of undesirable side products.

EXAMPLE 4

In this example the catalyst was prepared by dissolving 151 gms of copper nitrate 500 ml distilled water. A solution of ammonium dichromate was prepared by dissolving 78.75 gms of ammonium dichromate in 375 ml distilled water and adding dropwise approximately 55 ml of 30% aqueous ammonia solution. The solution of nitrate was stirred while the ammonium chromate solution was poured into it in a thin stream. Stirring was continued till the addition was completed after which a reddish brown precipitate was obtained. This precipitate was filtered and dried in a oven at 110° C. This dry precipitate was then calcined in a muffle furnace for one hour at 200° C., one hour at 300° C. and two hours at 400° C. The dry copper chromite catalyst thus obtained was pelletized and stored in bottles.

The catalyst composition before calcination and reduction is: Cu+Cr=100 mol %. After the activation of the catalyst the hydrogenation of diethyl maleate reaction was carried out as described earlier. The selectivity of tetrahydrofuran obtained was <20% and there was formation of undesirable side products.

EXAMPLE 5

In this example, a copper chromite catalyst with different composition was prepared by the following procedure. A mixture of 24.91 gm of copper nitrate, 31.65 gm of aluminum nitrate 12.08 gm of zinc nitrate, and 22.05 gms of barium nitrate was dissolved in 250 ml of distilled water. A solution of ammonium dichromate was prepared by dissolving 39.37 gms of ammonium dichromate in 190 ml distilled water and adding dropwise approximately 30 ml of 30% aqueous ammonia solution. The solution of nitrate was stirred while the ammonium chromate solution was poured into it in a thin stream. Stirring was continued till the addition was completed after which a reddish brown precipitate was obtained. This precipitate was filtered and dried in a oven at 110° C. This dry precipitate was then calcined in a muffle furnace for one hour at 200° C., one hour at 300° C. and two hours at 400° C. The dry copper chromite catalyst thus obtained was pelletized and stored in bottles.

The catalyst composition before calcination and reduction is: Cu+Cr=33 mol %, Ba=27 mol %, Zn=13 mol % and Al=27 mol %. After the activation of the catalyst, the hydrogenation of diethyl maleate reaction was carried out as described earlier. The selectivity of tetrahydrofuran obtained was <25 % and there was formation of undesirable side products.

EXAMPLE 6

In this example, a copper chromite catalyst with different composition was prepared by the following procedure. A mixture of 60.4 gm of copper nitrate, 37.51 gm of aluminum nitrate 29.75 gm of zinc nitrate, and 13.07 gms of barium nitrate was dissolved in 400 ml of distilled water. A solution of ammonium dichromate was prepared by dissolving 63.0 gms of ammonium dichromate in 300 ml distilled water and adding dropwise approximately 45 ml of 30% aqueous ammonia solution. The solution of nitrate was stirred while the ammonium chromate solution was poured into it in a thin stream. Stirring was continued till the addition was completed after which a reddish brown precipitate was obtained. This precipitate was filtered and dried in a oven at 110° C. This dry precipitate was then calcined in a muffle furnace for one hour at 200° C., one hour at 300° C. and two hours at 400° C. The dry copper chromite catalyst thus obtained was pelletized and stored in bottles.

The catalyst composition before calcination and reduction is : Cu+Cr=50 mol %, Ba=10 mol %, Zn=20 mol % and Al=20 mol %. After the activation of the catalyst, the hydrogenation of diethyl maleate reaction was carried out as described earlier. The selectivity of tetrahydrofuran obtained was ≅54%.

The main advantages of the invention are as follows:
i. There is no use of sodium bicarbonate in the preparation of the catalyst by the present process of the invention.
ii. The copper chromite catalyst prepared by the process of present invention shows no loss of its catalytic activity and selectivity in hydrogenation of diethyl maleate to tetrahydrofuran for a long period (at least for 630 hours).
iii. The copper chromite catalyst prepared by the process of present invention has a particular composition which gives very high conversion and selectivity of tetrahydrofuran in hydrogenation of diethyl maleate.
iv. There is a thorough mixing of catalyst component elements forming a homogeneous mixture of the catalyst precursors, which on calcination yields copper chromite catalyst with uniform composition of catalyst components.
v. All the catalyst components are in the oxide form due to the calcination procedure used in the process of present invention.

We claim:

1. A copper chromite catalyst having the molar composition $$Cu_{(a)}Cr_{(b)}Al_{(c)}Zn_{(d)}$$

wherein
a=10–40 mole %
b=10–40 mole %
c=10–30 mole %
d=5–40 mole %
and a+b+c+d=100 and having an XRD pattern as shown in Table I.

TABLE I

| XRD analysis of the copper chromite catalyst | |
|---|---|
| θ | Intensity (%) |
| 18. | 100 |
| 26.2 | 100 |
| 27.4 | 48 |
| 35.8 | 92 |
| 44.2 | 48 |
| 56.6 | 44. |

2. The catalyst as claimed in claim 1, wherein the catalyst consists essentially of mixed oxides of copper, chromium, aluminum and zinc.

3. A process for the preparation of a copper chromite catalyst having the molar composition $$Cu_{(a)}Cr_{(b)}Al_{(c)}Zn_{(d)}$$

wherein
a=10–40 mole %
b=10–40 mole %
c=10–30 mole %
d=0.5–40 mole %
and a+b+c+d=100 and having an XRD pattern as shown in Table I

TABLE I

| XRD analysis of the copper chromite catalyst | |
|---|---|
| θ | Intensity (%) |
| 18. | 100 |
| 26.2 | 100 |
| 27.4 | 48 |
| 35.8 | 92 |
| 44.2 | 48 |
| 56.6 | 44 | said process comprising the steps of:
(a) preparing an aqueous solution comprising a source of copper, a source of aluminum and a source of zinc;
(b) adding to the aqueous solution of step (a) a source of chromium while stirring to form a precipitate;

(c) recovering the precipitate and calcining the precipitate at a temperature between 200–500° C. for a period between 2–5 hours to obtain the catalyst.

4. A process as claimed in claim 3, wherein the source of copper is a copper salt selected from the group consisting of copper nitrate, copper sulfate, copper acetate and copper chloride.

5. A process as claimed in claim 3, wherein the source of aluminum is an aluminum salt selected from the group consisting of aluminum nitrate and aluminum oxide.

6. A process as claimed in claim 3, wherein the source of zinc is a salt of zinc selected from the group consisting of zinc nitrate, zinc sulfate, zinc chloride and zinc oxide.

7. A process as claimed in claim 3, wherein the source of chromium is an ammonium salt selected from the group consisting of ammonium dichromate and ammonium chromate.

8. A process as claimed in claim 3, wherein the source of aluminum is a chloride salt of aluminum.

9. A process as claimed in claim 3, comprising drying the precipitate recovered in step (c) at a temperature ranging between 80 to 110° C. prior to the calcining.

10. A process as claimed in claim 3, wherein the calcining in step (c) is carried out in three steps with the temperature in each of the three calcining steps being higher than the temperature in the preceding calcining step.

* * * * *